Sept. 12, 1967

J. W. FEENEY ET AL 3,341,349

FOLDING CARTON BLANK HAVING EDGES SEALED
WITH FLUOROCHEMICAL COMPLEXES AND
HYDROGENATED CASTOR OILS

Original Filed April 7, 1965

INVENTORS
JOSEPH W. FEENEY
PAUL L. POJAWIS
JAMES E. ALLENBAUGH, JR.
JOHN W. McNAIR, JR.

BY

ATTORNEY

3,341,349
FOLDING CARTON BLANK HAVING EDGES SEALED WITH FLUOROCHEMICAL COMPLEXES AND HYDROGENATED CASTOR OILS
Joseph W. Feeney, Pikesville, Md., Paul L. Pojawis, Pennsauken, and James E. Allenbaugh, Jr., Fords, N.J., and John W. McNair, Jr., New York, N.Y., assignors to International Paper Company, New York, N.Y., a corporation of New York
Continuation of application Ser. No. 478,019, July 26, 1965, which is a continuation of application Ser. No. 446,372, Apr. 7, 1965. This application July 11, 1966, Ser. No. 564,423
3 Claims. (Cl. 117—44)

ABSTRACT OF THE DISCLOSURE

Folding cartons having a superior grease, moisture, water, and gas transmission barrier property, as well as print-ability, product flavor retentivity, sifting loss resistance, external odor product contamination resistance, and insect and fungal product attack resistance, by virtue of the disposition solely on the free edges of the cartons of water-soluble fluorochemical complexes or hydrogenated castor oils.

---

Figure 1:
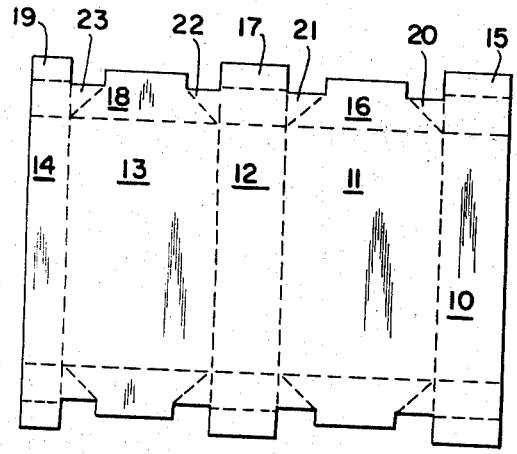

This application is a continuation of application Ser. No. 478,019, filed July 26, 1965, which is a continuation of application Ser. No. 446,372, filed Apr. 7, 1965, and now abandoned, which is a continuation-in-part of application Ser. No. 261,053, filed Feb. 26, 1963, and now U.S. Patent No. 3,187,480.

This invention relates to packaging with paperboard in the form of folding cartons, carton lids, folders, trays, cards, and the like. More particularly, it relates to the packaging of products having a grease content or being moisture-sensitive to a substantial degree.

Products having a relatively high grease content or being subject to moisture loss or gain, particularly shelf-type foodstuff products such as cake and pie crust mixes, breakfast cereals, and the like, are now commonly marketed in waxed glassine or plastic bags or liners inserted into a paperboard container upon which advertising and instructive information is printed. The waxed glassine or, for example, polyethylene bags are filled, sealed or crimped, and introduced into the container by the packager. In this type of packaging, the waxed glassine or polyethylene bags provide the barrier which keeps the grease of the product in (where it cannot provide a path for the spoilage or contamination of the product or the containers) or the moisture of the atmosphere or product out or in, respectively, and the containers provide protection against grosser injury to the product resulting from either normal or improper handling.

It is known that the bag-in-the-box variety of packaging, especially for foodstuffs, is not entirely satisfactory. The bags are difficult to fill, seal, and insert into the containers and the consumer has difficulty both in opening and reclosing this type of package, particularly where inadequacy in the re-closing can adversely affect the life of the product.

It is also known that new advances in the art of laminating or otherwise bringing together paperboard and protective agents or barrier coatings such as paraffin waxes, microcrystalline waxes, waxes blended with polymers, vinyl co-polymer blended waxes, polyvinylidene chloride, and polyolefins have resulted in improved grease and moisture barrier characteristics for the paperboard. In consequence, in some instances, products can be packaged safely and attractively in containers made of the augmented paperboard and without recourse to waxed glassine or plastic bags. See, for instance, U.S. Pat. Nos. 2,999,758 and 3,015,596.

Heretofore, however, there does not appear to have been developed a paperboard-based packaging material, design, or method which results in a single unit folding carton or the like having substantially equal utility for grease-bearing or exuding products and water-absorbing or water-emitting products and creating no additional problems. It has been proposed to place a barrier coating of plastic or the like on the inner wall of a paperboard folding carton to abut a greasy product and to contain the grease, but this leaves the outer wall of the carton and the edges thereof without the requisite resistance to grease penetration, moisture vapor transfer, or water absorption. It has been proposed to place a barrier coating on the outer wall of a paperboard folding carton for a water-absorbent product and to exclude moisture or water, but this leaves the inner wall of the carton and the edges thereof susceptible to attack by any fats or greases normally in the product and leads to difficulties in achieving and maintaining attractive printing or decoration of the outer wall. It has been proposed to place barrier coatings on both the inner and outer walls of paperboard folding carton, but this tends to diminish or obviate the economic advantage sought by the initial resort to paperboard as the carton material. Or, it results in a packaging material inferior in performance to the bag-in-the-box combination.

Some of the objects of the present invention are to secure a paperboard-based packaging material, design, and method productive of a single unit folding carton or its equivalent having a superior grease, moisture or water, and gas transmission barrier property and other characteristics such as printability, product flavor retentivity, sifting loss resistance, external odor product contamination resistance, and insect and fungal product attack resistance. Other objects will become evident to those skilled in the art from the following disclosure.

Broadly, the present invention encompasses a process made up of the steps of (a) barrier coating at least one surface of a paperboard web or sheet; (b) die cutting flat folding carton blanks having free edges from the barrier coated web or sheet; (c) tightly compressing a stack of a plurality of the flat folding carton blanks; (d) submerging the compressed stack in a bath of free edge sealing material for a pre-determined dwell time; (e) removing the compressed stack from the bath; (f) forming folding cartons, wherein a barrier coated paperboard web or sheet surface is disposed interiorly, from the flat folding carton blanks; (g) filling the formed folding cartons with a product characterized by at least one of the conditions selected from the group consisting of grease-bearing, moisture-sensitivity, and gas sensitivity; and, (h) closing the filled cartons. Preferably, the paperboard web or sheet or, more generally, substrate is previously prepared for printing, as by being clay coated in accordance with conventional procedures, on that surface which is not to be barrier coated in accordance with the present invention or on top of one of the barrier coated surfaces. Also, it is preferable, not to say most convenient, to accompany the die cutting step with a blank scoring step. Again, it has been found preferable to have the bath hot and agitated during the stack submersion, so as to promote the penetration and the sealing of the free edges by the sealing material. A sealed free edge drying period is also desirable. Then too, the step of printing the blanks on their non-barrier coated surfaces with indicia of advertising and instruction before the cartons are formed and the use of adhesives or heat sealing to assist in the carton closing is preferred.

Among the grease, moisture, and gas barrier coatings found useful in the practice of the present invention are, and these are cited from a broad grouping only for example, low, medium, and high density polyethylene, polyvinylidene chloride, aluminum foil, grease-proof paper, glassine, alone or in combination with each other or laminating-promoting agents. These materials were laid down in thicknesses of from about 0.0001″ to 0.0015″ on paperboards having thicknesses of from about 0.013″ to 0.024″ and made commercially available by International Paper Company under the trademarks "Mosscoat," "Snobrite," "IPB," and "IPX." These boards are all clay coated for printing purposes and made from bleached sulfate pulp or other mixed virgin pulps, but they vary in density.

Figure 2:
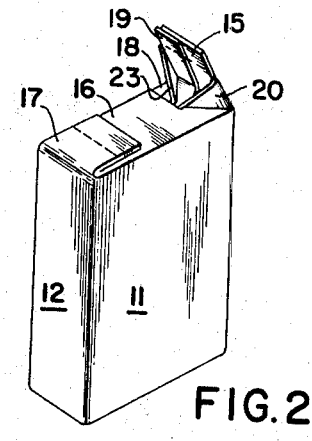
Figure 3:
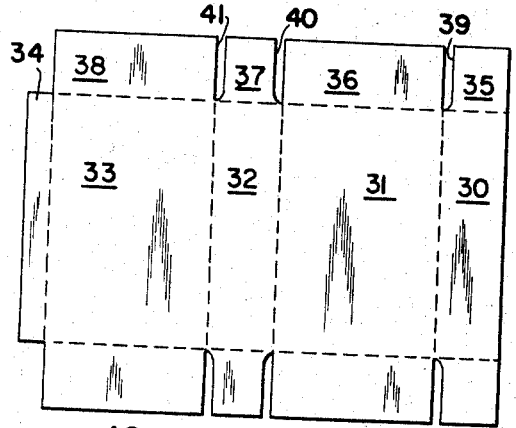
Figure 4:
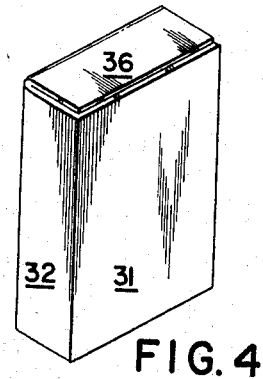
Figure 5:
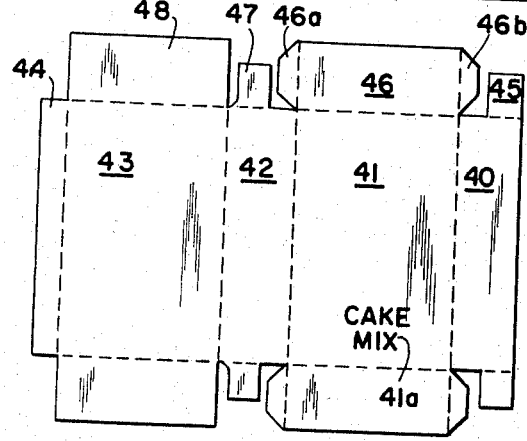
Figure 6:
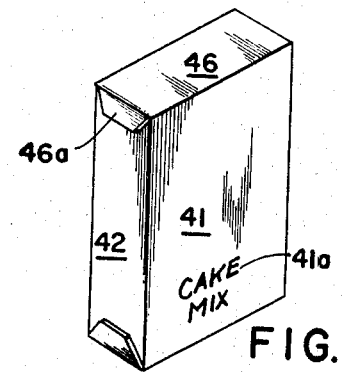

Among the folding carton blank designs having particular utility in accordance with the present invention are the three depicted in the plan views of attached FIGURES 1, 3, and 5 and the isometric views of the cartons formed therefrom in FIGURES 2, 4, and 6. FIGURE 1 shows a blank scored vertically, horizontally, and diagonally which yields the web-cornered, especially sift-proof carton of FIGURE 2 comprised of side panels 10 and 12, front panel 11, back panel 13, and glue panel 14, as well as top closure members or flaps 15, 16, 17, 18, and 19 and web corner portions 20, 21, 22, and 23 and comparable, but unnumbered bottom closure elements. FIGURE 3 shows a blank scored vertically and horizontally which yields the carton of FIGURE 4 comprised of side panels 30 and 32, front panel 31, back panel 33, and glue panel 34, as well as top closure members or flaps 35, 36, 37, and 38 and similar, unnumbered bottom closure parts. (It will be noted that flaps 35, 36, 37, and 38 are not merely bounded on their sides by slits separating them from one another, but that die cutting means have been utilized to produce V-cuts 39, 40, and 41 in flaps 35 and 37 and to free the edges of such sides from each other.) FIGURE 5 shows a blank scored vertically and horizontally which yields the carton of FIGURE 6 comprised of side panels 40 and 42, front panel 41 (whereon printed instructive and advertising indicia 41a are shown), back panel 43, and glue panel 44, as well as top closure flaps 45, 46, 47 and ears 46a and 46b and equivalent, unnumbered bottom closure portions. (It will be seen that the blank of FIGURE 5 is like that of FIGURE 3 insofar as it utilizes enlarged or V-cuts to free the edges of flaps 45 and 46 from those of ears 46a and 46b and flaps 48.)

To date, the blank and carton of FIGURES 5 and 6 have given the best results under this invention. However, all of the blanks have in common the structural feature of free edges, i.e., exterior edges nowhere impinging upon or impinged upon by other edges of the same blank.

The apparatus for submerging a stack of flat folding carton blanks like those depicted in FIGURES 1 to 6 in the edge sealing bath need involve, in a bench model, nothing more than metal, expanded metal, or even plywood platens, preferably cut to conform along their peripheries with the outlines of the blanks they are to hold; mechanical, pneumatic, or hydraulic clamping means to hold the platens in place and tightly compress the stack so as to prevent seepage of the edge sealing material between the flat surfaces of the folding carton blanks; a tank for the edge sealing material; means such as a chain hoist to lower the stack into the bath and raise it out of the bath; and, preferably, a bath heating unit and a bath agitation unit, e.g., a stirrer or an ultrasonic vibrator. Production models can, of course, be further refined.

At least two classes of edge sealing materials can be employed in achieving the results of this invention. One class includes those agents which are inert to and do not react with the individual cellulose fibers exposed along the free edges of the paperboard carton blanks and the neighboring fibers, but, rather, have the capability of filling the interstices or voids between such fibers. A hydrogenated castor oil such as Archer-Daniels-Midland Company's Hydrofoil Glycerides #200 or Baker Oil Company's "Castorwax" falls into this class. The other class includes those agents which react with the individual cellulose fibers contacted and an example of such an agent is the water-soluble fluorochemical chromium complex otherwise described as the chromium (Cr III) complex of N-ethyl-N-heptadecylfluoro-octane sulfonyl glycine and sold by the 3M Company under the designations FC–805 Paper Chemical and "Scotchgard." One group of water-soluble fluorochemical complexes found to be both useful and economical in the process and products of the present invention is the group of fluoroalkyl compounds described in U.S. Pat. No. 3,083,224, issued Mar. 26, 1963. These compounds are polyfluoroalkyl phosphates covered by the following formula:

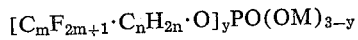

$$[C_mF_{2m+1} \cdot C_nH_{2n} \cdot O]_yPO(OM)_{3-y}$$

wherein M stands for a water-solubilizing cation such as hydrogen, an alkali-metal, ammonium or substituted ammonium; $y$ is a number of average value from 1.0 to 2.5; $n$ is an integer from 1 to 16; $m$ is an integer from 4 to 12; and, the two radicals $C_m$ and $C_n$ contain jointly a straight chain of not less than 8 C-atoms. Again, it has been found that a commercially available product "Zonyl RP" put out by E. I. du Pont de Nemours and Company is of substantial interest in this regard. The active portion of this product is comprised of the diethanolamine salts of an equimolar mixture of mono and bis (fluoroalkyl) phosphates and it comes, at a level of about 33.3% by weight, in a solvent which contributes about 10% by weight "Freon-113" [i.e., $CCl_2F$—$CF_2Cl$]; about 20% by weight isopropanol [i.e., $(CH_3)_2CHOH$]; and, about 36.7% water.

Just how effective a combination of the foregoing process steps and substrates, barrier coatings, folding carton blank designs, and free edge sealing materials can be is both unexpected and surprising. For example, a barrier coated stock was produced by conventional laminating means which comprised 25 lb. opaque glassine/1.5 mil polyethylene/0.015″ "IPB" paperboard. About 150 carton blanks conforming to FIG. 5 were cut from such stock and stacked. Then, the stack was compressed under about 20 lbs. per sq. in. pressure between two platens and lowered into a bath of FC–805 Paper Chemical. The temperature of the bath was about 75° F. and it was continuously agitated during the submersion of the stock in the bath. The submersion lasted approximately 10 seconds. The stack was then withdrawn from the bath and the free edges of the blanks were permitted to dry for 24 hours at room temperature and 44% relative humidity. Next, cartons were formed from some of the blanks and the cartons were filled with an apple raisin cake mix, marketed by a well-known manufacturer under the "Duncan Hines" imprint, into which a red dye had been introduced. Thereafter, the filled cartons were placed in an oven, held at a temperature of 110° F. for 3.25 weeks and, thereby, subjected to a shelf-life of about 13 weeks. At the end of the oven treatment, no incursion of the red dye along the edges of the cartons or on their surfaces was visible to the naked eye, though, by way of contrast, varying, but serious, degrees of such incursions—denoting edge-wicking of the grease content of the cake mix by the paperboard of the cartons—was noted in sample cartons similar in design and manufacture except for the exclusion of the barrier coating or the edge sealing or both. Additional tests, the same or closely similar in all particulars, except that "Castorwax" was used in place of the FC–805 Paper Chemical and the immersion therein took place in a bath held at about 320° F. with a dwell time of about 3.5 minutes, have been conducted with generally comparable results.

There is every reason to believe that the foregoing presents or suggests solutions to problems arising in other areas of the packaging field. The packaging of fluids such as milk and dairy products derived therefrom, frozen goods such as meats, soaps and detergents, and lubricated metal parts can be advanced by one or more of the several aspects of this invention.

What is claimed is:

1. A folding carton blank cut from paperboard and having disposed solely on one of its edges an edge sealing material selected from the group consisting of water-soluble fluorochemical complexes and hydrogenated castor oils.

2. A folding carton formed from the blank of claim 1.

3. A single unit folding carton blank cut from paperboard, having free edges, and having disposed solely on the free edges an edge sealing material selected from the group consisting of water-soluble fluorochemical complexes and hydrogenated castor oils.

References Cited

UNITED STATES PATENTS

| | | |
|---|---|---|
| 2,019,242 | 10/1935 | Aument _____ 93—36 |
| 2,319,957 | 5/1943 | Speicher _____ 117—157 |
| 2,350,292 | 5/1944 | Sermattei _____ 117—122 X |
| 2,555,315 | 6/1951 | Carroll _____ 93—36 |
| 2,659,340 | 11/1953 | Zinn _____ 117—44 |
| 2,796,007 | 6/1957 | Bergstein _____ 93—36 |
| 2,984,161 | 5/1961 | Cook et al. _____ 93—36 |
| 3,013,709 | 12/1961 | Mason _____ 229—3.1 |
| 3,055,152 | 9/1962 | Williams _____ 53—29 |
| 3,187,480 | 6/1965 | Feeney et al. _____ 53—29 |
| 3,231,462 | 1/1966 | Oswald et al. _____ 161—235 |
| 3,257,065 | 6/1966 | Bowman et al. _____ 93—36 X |

WILLIAM D. MARTIN, *Primary Examiner.*

M. LUSIGNAN, *Assistant Examiner.*